US012625769B2

(12) United States Patent
Yen et al.

(10) Patent No.: US 12,625,769 B2
(45) Date of Patent: May 12, 2026

(54) ERROR HANDLING METHOD BASED ON REDUNDANT ARRAY OF INDEPENDENT DISKS TYPE CHECK AND RELATED MEMORY CONTROLLER AND DATA STORAGE DEVICE

(71) Applicant: Silicon Motion, Inc., Hsinchu County (TW)

(72) Inventors: Hsiao-Chang Yen, Hsinchu County (TW); Tsu-Han Lu, Hsinchu City (TW)

(73) Assignee: Silicon Motion, Inc., Hsinchu County (TW)

( * ) Notice: Subject to any disclaimer, the term of this patent is extended or adjusted under 35 U.S.C. 154(b) by 30 days.

(21) Appl. No.: 18/650,046

(22) Filed: Apr. 29, 2024

(65) Prior Publication Data

US 2025/0278334 A1     Sep. 4, 2025

(30) Foreign Application Priority Data

Feb. 29, 2024   (TW) ................................. 113107174

(51) Int. Cl.
*G06F 11/00* (2006.01)
*G06F 11/10* (2006.01)
*G06F 11/20* (2006.01)

(52) U.S. Cl.
CPC ........ *G06F 11/108* (2013.01); *G06F 11/1016* (2013.01); *G06F 11/203* (2013.01)

(58) Field of Classification Search
CPC .. G06F 11/108; G06F 11/1016; G06F 11/203; G06F 11/0727; G06F 11/0793; G06F 11/2053; G06F 11/2094
See application file for complete search history.

(56) References Cited

U.S. PATENT DOCUMENTS

| | | | | |
|---|---|---|---|---|
| 8,327,250 | B1 * | 12/2012 | Goel ................... | G06F 11/1092 |
| | | | | 714/801 |
| 2020/0005874 | A1 * | 1/2020 | Shappir ................. | G11C 16/26 |
| 2022/0156143 | A1 * | 5/2022 | Zamir ................ | G06F 13/1668 |
| 2022/0342811 | A1 * | 10/2022 | Yang ................... | G06F 12/0882 |
| 2023/0229326 | A1 * | 7/2023 | Buxton ................. | G06F 3/0619 |
| | | | | 711/154 |
| 2023/0280930 | A1 | 9/2023 | Song | |
| 2024/0329853 | A1 * | 10/2024 | Cosby ................... | G06F 3/0617 |

FOREIGN PATENT DOCUMENTS

| | | |
|---|---|---|
| TW | I707345 B | 10/2020 |
| TW | I773890 B | 8/2022 |

* cited by examiner

*Primary Examiner* — Joseph D Manoskey
(74) *Attorney, Agent, or Firm* — Winston Hsu

(57) ABSTRACT

An error handling method for use in a flash memory includes: in response to read data on which a decoding failure occurs or written data on which a programming failure occurs, determining verification data corresponding to the read data or the written data; according to the verification data, selecting data to be moved from the flash memory; and performing a data movement operation to move the data to be moved to a target storage space in the flash memory.

21 Claims, 8 Drawing Sheets

| Channel | 0 | | | | 1 | | | |
|---|---|---|---|---|---|---|---|---|
| Plane \ Page | 0 | 1 | 2 | 3 | 0 | 1 | 2 | 3 |
| 0 | 0 | 1 | 2 | 3 | 4 | 5 | 6 | 7 |
| 1 | 8 | 9 | 10 | 11 | 12 | 13 | 14 | 15 |
| 2 | 16 | 17 | 18 | 19 | 20 | 21 | 22 | RP0 |
| 3 | 23 | 24 | 25 | 26 | 27 | 28 | 29 | RP1 |
| 4 | 30 | 31 | 32 | 33 | 34 | 35 | 36 | 37 |
| 5 | 38 | 39 | 40 | 41 | 42 | 43 | 44 | 45 |
| 6 | 46 | 47 | 48 | 49 | 50 | 51 | 52 | RP2 |
| 7 | 53 | 54 | 55 | 56 | 57 | 58 | 59 | RP3 |

FIG. 2A

| Channel | 0 | | | | 1 | | | |
|---|---|---|---|---|---|---|---|---|
| Plane \ Page | 0 | 1 | 2 | 3 | 0 | 1 | 2 | 3 |
| 0 | 0 | 1 | 2 | 3 | 4 | 5 | 6 | RP0 |
| 1 | 7 | 8 | 9 | 10 | 11 | 12 | 13 | RP1 |
| 2 | 14 | 15 | 16 | 17 | 18 | 19 | 20 | RP2 |
| 3 | 21 | 22 | 23 | 24 | 25 | 26 | 27 | RP3 |
| 4 | 28 | 29 | 30 | 31 | 32 | 33 | 34 | RP4 |

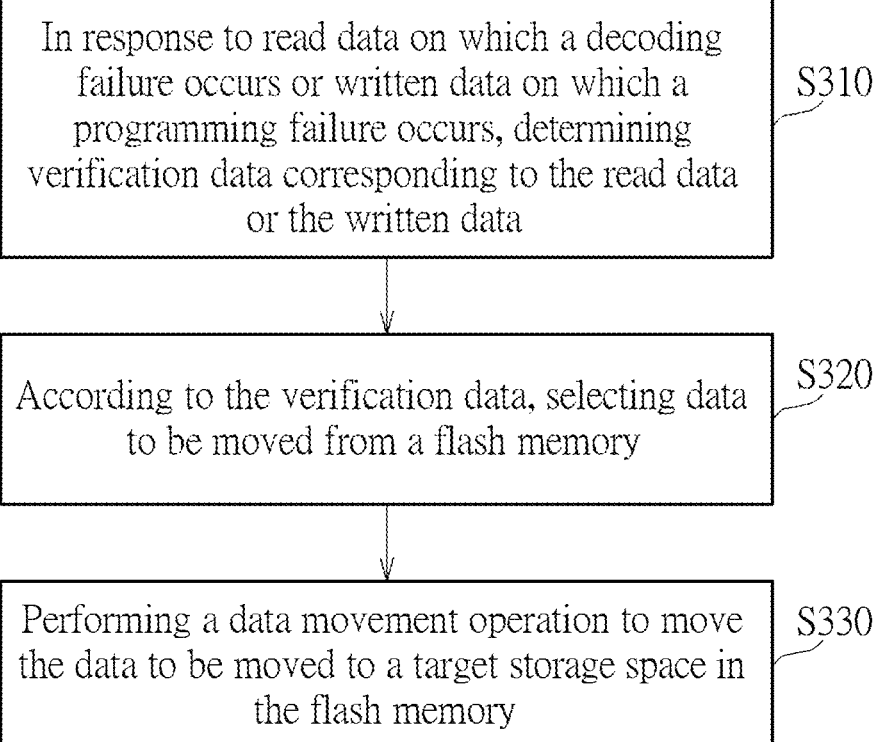

In response to read data on which a decoding failure occurs or written data on which a programming failure occurs, determining verification data corresponding to the read data or the written data — S310

According to the verification data, selecting data to be moved from a flash memory — S320

Performing a data movement operation to move the data to be moved to a target storage space in the flash memory — S330

FIG. 7

ERROR HANDLING METHOD BASED ON REDUNDANT ARRAY OF INDEPENDENT DISKS TYPE CHECK AND RELATED MEMORY CONTROLLER AND DATA STORAGE DEVICE

BACKGROUND OF THE INVENTION

1. Field of the Invention

The present invention relates to flash memory, and in particular, refers to an error handling method based on redundant array of independent Disks verification, as well as related memory controllers and data storage devices.

2. Description of the Prior Art

Error correction coding (ECC) is relied upon to correct reading errors in the flash memory storage devices. Before data is stored into the flash memory storage devices, it can be encoded by an ECC encoder to generate protection information. Such information can be stored as ECC codewords together with original data. In addition, the flash memory storage devices also rely upon a redundant array of independent Disks (RAID)-type data protection mechanism, which utilizes RAID parity to implement data verification and error correction. The RAID-type verification and correction can be used to handle errors that exceed the correction capabilities of ECC.

Generally speaking, when an ECC decoding failure or a RAID decoding failure is detected, an error handling mechanism running on the flash memory storage device would reclaim block(s) to which erroneous data belongs, and all data in the block(s) will be moved to other block(s) in the flash memory storage device to avoid potential data corruption. However, as storage density of the flash memory stage devices increases, the size of a single block has also increased significantly. The amount of data that needs to be moved due to the decoding failure would also increase significantly. In view of this, there is a need of providing a more efficient error handling mechanism to solve the above problems.

SUMMARY OF THE INVENTION

In view of this, it is one object of the present invention to provide an innovative error handling mechanism. In embodiments of the present invention, when moving data in response to errors, the error handling procedure will consider a range of data to be moved based on a protection range of RAID verification data. In other words, when an error occurs (such as a decoding failure in reading data or a programming failure in writing data), only the data associated with (e.g., protected by) the same RAID verification data will be moved. In this way, the amount of the data that needs to be moved is effectively reduced and the efficiency of error handling is also improved. In addition, as is known, the flash memory has a limited number of write/erase cycles (P/E cycles). Therefore, when the amount of data that needs to be moved during the error handling is reduced, the life span of the flash memory storage device can be extended while ensuring data security.

According to one embodiment, an error handling method for use in a flash memory is provided. The error handling method comprises: in response to read data on which a decoding failure occurs or written data on which a programming failure occurs, determining verification data corresponding to the read data or the written data; according to the verification data, selecting data to be moved from the flash memory; and performing a data movement operation to move the data to be moved to a target storage space in the flash memory.

According to one embodiment, a memory controller for use in a flash memory is provided. The memory controller comprises: a storage unit and a processing unit. The storage unit is configured to store program code. The processing unit is configured to execute the program code to perform error handling procedure on the flash memory, comprising: in response to read data on which a decoding failure occurs or written data on which a programming failure occurs, determining verification data corresponding to the read data or the written data; according to the verification data, selecting data to be moved from the flash memory; and performing a data movement operation to move the data to be moved to a target storage space in the flash memory.

According to one embodiment, a data storage device is provided. The data storage device comprises a flash memory and a memory controller. The memory controller comprises: a storage unit and a processing unit. The storage unit is configured to store program code. The processing unit is configured to execute the program code to perform error handling procedure on the flash memory, comprising: in response to read data on which a decoding failure occurs or written data on which a programming failure occurs, determining verification data corresponding to the read data or the written data; according to the verification data, selecting data to be moved from the flash memory; and performing a data movement operation to move the data to be moved to a target storage space in the flash memory.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2A and FIG. 2B are diagrams illustrating RAID-type verification mechanism according to one embodiment of the present invention.

FIG. 4 is a diagram illustrating an in-block programming strategy according to one embodiment of the present invention.

FIG. 7 is a flow chart illustrating an error handling procedure according to one embodiment of the present invention.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
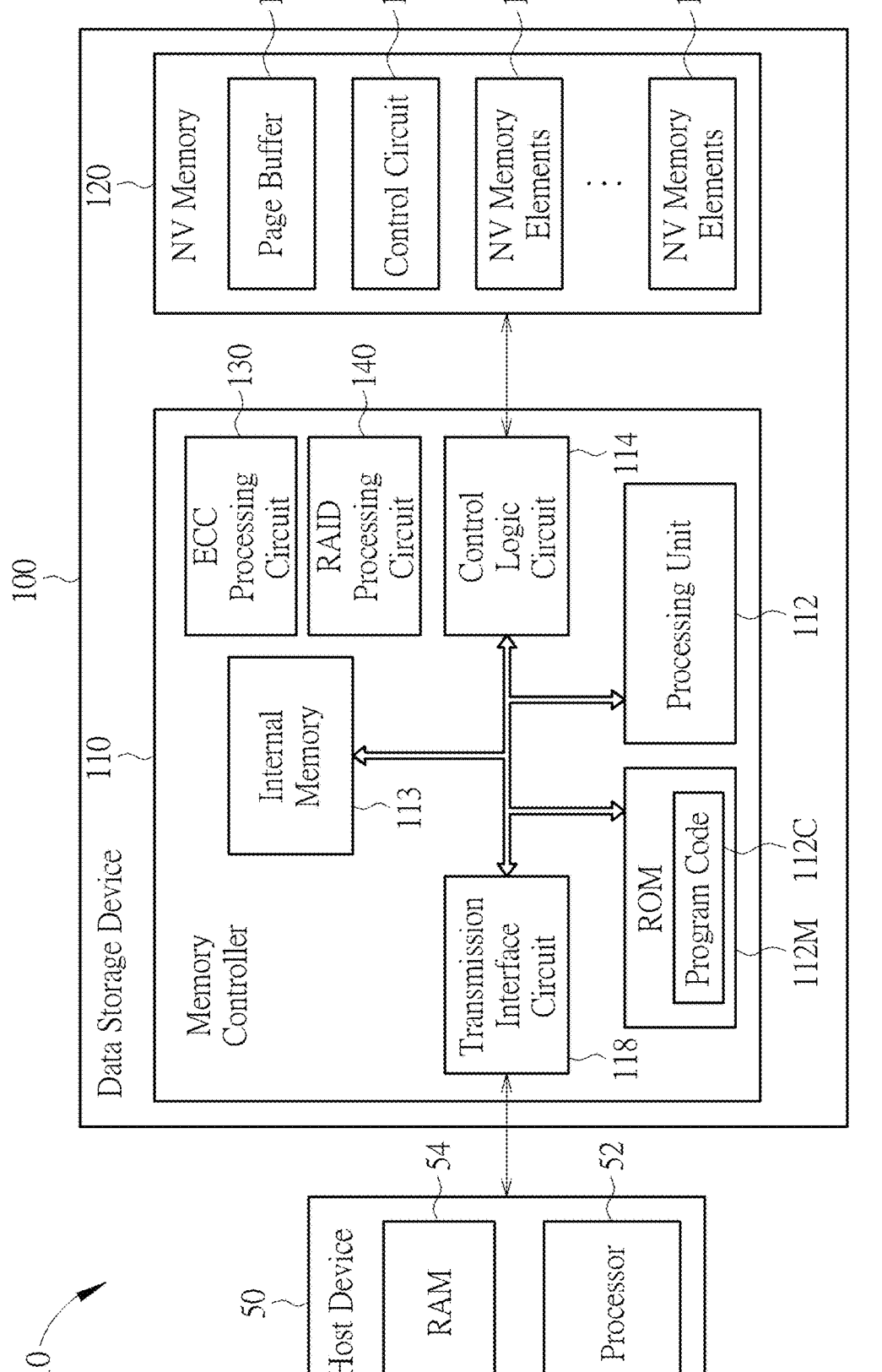
FIG. 1 illustrates a schematic diagram of a data storage device according to one embodiment of the present invention.

FIG. 1 is a schematic diagram illustrating an electronic device and a data storage device according to one embodiment of the present invention. As illustrated an electronic device 10 comprises a host device 50 and a data storage device 100. The host device 50 may comprise: at least one processor 52 configured to control operations of the host device 50, and a random access memory 54 configured to store data and information required by the processor 52. Examples of the host device 50 may include, but are not limited to: a smartphone, a tablet computer, a wearable device, a personal computer (such as, a desktop computer or a laptop computer), an imaging device (such as, a digital still camera or a video camera), a game console, a car navigation system, a printer, a scanner, or a server system. Examples of the data storage device 100 may include, but are not limited to: a portable memory device (such as a memory card conforming to SD/MMC, CF, MS, XD, or UFS specifications), a solid-state drive (SSD), and various embedded storage devices (such as an embedded storage device conforming to UFS or EMMC specifications).

According to various embodiments, the data storage device 100 may comprise a controller (such as, a memory controller 110) and may further comprise a non-volatile (NV) memory 120. The NV memory 120 is configured to store data and information. The NV memory 120 may comprise one or more NV memory elements, such as a plurality of NV memory elements 122_1-122_N. For example, the NV memory 120 may be a flash memory, and the NV memory elements 122_1-122_N may be a plurality of flash memory chips or a plurality of flash memory dies, respectively, but the present invention is not limited thereto. In addition, the NV memory 120 may comprise memory cells having a two-dimensional structure or memory cells having a three-dimensional structure.

As shown in FIG. 1, the memory controller 110 may comprise a processing unit 112, a read-only memory (ROM) 112M, an internal memory 113, a control logic circuit 114, and a transmission interface circuit 118, an error correction coding (ECC) processing circuit 130 and a redundant array of independent disks (RAID) processing circuit 140. At least one portion of these circuits and components may be coupled to one another through a bus. The internal memory 113 can be implemented by one or more RAM devices. For example, the internal memory 113 may comprise a static RAM (SRAM) and/or a dynamic RAM (DRAM). The internal memory 113 could be configured to provide internal storage space for the memory controller 110, for example, temporarily storing information, such as data, addresses, commands, mapping information, and/or variables/parameters. In some embodiments, the memory controller 110 may not include the internal memory 113. Instead, the memory controller 110 may rely on host memory buffer (HMB) technology. With the HMB technology, the memory controller 110 could utilize the RAM 54 (such as DRAM) of the host device 50, as a whole, a part or an extension of the internal memory 113, thereby improving read and write performance of the data storage device 100.

In addition, the ROM 112M in this embodiment is configured to store program code 112C, and the microprocessor 112 is configured to execute the program code 112C, thereby controlling access to the NV memory 120. The program code 112C may include one or more program modules, such as boot loader code. When the data storage device 100 obtains power from the host device 50, the processing unit 112 may execute an initialization process of the data storage device 100 by executing the program code 112C. During the initialization process, the microprocessor 112 may load a set of in-system programming (ISP) codes (not shown in FIG. 1) from the NV memory 120. The microprocessor 112 can execute the ISP codes so that the data storage device 100 can be operable to perform various functions. According to one embodiment of the present invention, the set of ISP codes may include, but are not limited to: one or more program modules associated with memory access (e.g., reading, writing, and erasing), such as, a read operation module, a lookup table module, a wear leveling module, a read refresh module, a read reclaim module, and a garbage collection module, an sudden power-off recovery (SPOR) module, which are provided to perform corresponding reading, lookup table querying, wear leveling, read refreshing, read reclaiming, garbage collection, SPOR and other operations.

The memory controller 110 controls reading, writing, and erasing of the NV memory 120 through a control logic circuit 114. In addition, the memory controller 110 could perform writing of data based on host commands from the host device 50 and writing of valid data which is read from the NV memory 120 by a garbage collection and/or a wear-leveling operation concurrently. The transmission interface circuit 118 may conform to a specific communications specification, such as, Universal Serial Bus (USB) specification, Secure Digital (SD) interface, Ultra High Speed-I (UHS-I) interface, Ultra High Speed-II Compact Flash (UHS-II), (CF) interface, Multimedia card (MMC) interface, embedded Multimedia Card (eMMC) specification, Advanced Technology Attachment (ATA), Serial Advanced Technology Attachment (SATA), Parallel Advanced Technology Attachment (PATA), Peripheral Component Interconnect Express (PCI-E), and Universal Flash Storage (UFS) specification, and may perform communications with the host device 50 according to the specific communications specification.

Typically, the host device 50 may indirectly access the memory device 100, through transmitting host commands and corresponding logic addresses to the memory controller 110. The memory controller 110 receives the host commands and the logic addresses, and translates the host commands to memory operation commands, and further controls the NV memory 120 with the memory operation commands to perform read, program or erase operations upon memory cells or data pages having physical addresses within the NV memory 120. The NV memory 120 includes one or more page buffers 121 (which may be implemented by SRAM), and one or more control circuits 123. Data that the memory controller 110 intends to program to the NV memory 120 will be written into the page buffer 121 before being programmed to the memory cells. The one or more control circuits 123 will read, program, or erase data based on the memory operation commands sent by the memory controller 110. When the memory controller 110 performs an erase operation on any one of the NV memory elements 122_1-122_N, at least one block in the NV memory element 122_k may be erased. In addition, each block of the NV memory element 122_k can include multiple pages, and access operations (for example, read or write) are performed on one or more pages.

In one embodiment, each of the NV memory elements 122_1-122_N may be a NV memory die or chip. Each of NV memory dies 122_1-122_N is equipped with control circuitry for executing memory operation commands issued by the memory controller 110. Additionally, each of NV memory dies 122_1-122_N may include multiple planes. Each plane might have multiple blocks composed of memory cells, along with associated row and column control circuitry. Memory cells in each plane can be arranged in either a 2D or 3D memory structure. Moreover, through multi-plane operation commands, various memory operations can be parallel or simultaneously performed on different planes. That is, memory operations can be applied parallel or simultaneously on memory blocks of different planes to perform multi-plane reading, writing or erasing operations. In one embodiment, the memory controller 110 can be utilized to combine memory blocks of the NV memory 120 into multiple super blocks. In one embodiment, a composition of a super block can span across NV memory chips 122_1-122_N. Additionally, the super block can be utilized as one or more storage blocks in each of NV memory chips 122_1-122_N.

In one embodiment, a logical-to-physical (L2P) address mapping table having multiple L2P address mapping entries, can be divided into multiple mapping groups. Each mapping group includes a part of entries of the L2P address mapping table and is utilized for performing logical-to-physical address translation. These L2P mapping groups are permanently stored in blocks of NV memory 120 and are loaded into the internal memory 113 when needed. Similarly, a physical-to-logical (P2L) address mapping table having multiple P2L address mapping entries, can be divided into multiple mapping groups. Each mapping group includes a part of entries of the P2L address mapping table and is utilized for performing physical to logical address translation. These P2L mapping groups are permanently stored in blocks of NV memory 120

In the present invention, data stored in the NV memory 120 is protected by ECC verification and correction and RAID-type verification and correction performed by the ECC processing circuit 130 and the RAID processing circuit 140, respectively. Specifically, the ECC processing circuit 130 can be based on low-density parity-check code (LDPC code) architecture, perform ECC encoding on original data sent by the host device 50 when data writing is performed, and generate an ECC codeword including ECC verification data (e.g., ECC parity data). The ECC codeword will be written into the NV memory 120 as stored data. Furthermore, when data reading is performed, the ECC processing circuit 130 performs an ECC verification operation to facilitate ECC decoding on the data read from the NV memory 120 and accordingly return correct data to the host device 50. Furthermore, the RAID processing circuit 140 performs RAID encoding (which may be based on an exclusive-OR operation) on a certain amount of stored data (i.e., codewords generated by ECC encoding) in the NV memory 120, so as to generate RAID verification data (e.g., RAID parity data) corresponding to the stored data. Typically, if the ECC processing circuit 130 cannot correct the error through the ECC verification data (e.g., ECC parity data) in the codeword, the RAID processing circuit 140 would be utilized to correct the error through the RAID verification data (e.g., RAID parity data). Please refer further to FIG. 2A and FIG. 2B.

FIG. 2A and FIG. 2B illustrates RAID-type verification mechanism according to one embodiment of the present invention. In the following descriptions, it is assumed that the NV memory 120 is a dual-channel memory including channel 0 and channel 1, and the NV memory elements 122_1 and 122_2 of the NV memory 120 are respectively coupled to one of channel 0 and channel 1. Moreover, it is also assumed that the NV memory elements 122_1 and 122_2 on each channel have 4 planes respectively (namely, plane 0-plane 3), and each plane has 8 pages. In the embodiment of FIG. 2A, page data 0-page data 59 are stored in pages of plane 0-plane 3 of channel 0 and channel 1, respectively, and page data 0-page data 59 could respectively correspond to one or more codewords generated by ECC encoding. In addition, RAID verification data RP0-RP3 used to protect page data 0-page data 59 are also stored in the pages of plane 0-plane 3 of channel 0 and channel 1. The RAID verification data RP0 is generated by performing RAID verification data encoding on page data 0-page data 7 and page data 16-page data 22 (e.g., performing the exclusive OR (XOR) operation on page data 0-page data 7 and page data 16-page data 22), and can be utilized to detect and correct errors in page data 0-page data 7 and page data 16-page data 22. The RAID verification data RP1 is generated by performing RAID verification data encoding on page data 8-page data 15 and page data 23-page data 29 (e.g., performing the XOR operation on page data 8-page data 15 and page data 23-page data 29), and can be utilized to detect and correct errors in page data 8-page data 15 and page data 23-page data 29. The RAID verification data RP2 is generated by performing RAID verification data encoding on page data 30-page data 37 and page data 46-page data 52, and can be utilized to detect and correct errors in page data 30-page data 37 and page data 46-page data 52. The RAID verification data RP3 is generated by performing RAID verification data encoding on page data 38-page data 45 and page data 53-page data 59, and can be utilized to detect and correct errors in page data 38-page data 45 and page data 53-page data 59.

In the embodiment shown by FIG. 2B, page data 0-page data 34 are stored in pages of plane 0-plane 3 of channel 0 and channel 1, respectively, and page data 0-page data 34 could respectively correspond to one or more codewords generated via ECC encoding. In addition, RAID verification data RP0-RP4 that are utilized to protect page data 0-page data 34 are also stored in pages of plane 0-plane 3 of channel 0 and channel 1. The RAID verification data RP0 is generated by performing RAID verification data encoding on page data 0-page data 6, and can be utilized to detect and correct errors in page data 0-page data 6. The RAID verification data RP1 is generated by performing RAID verification data encoding on page data 7-page data 13, and can be utilized to detect and correct errors in page data 7-page data 13. The RAID verification data RP2 is generated by performing RAID verification data encoding on page data 14-page data 20, and can be utilized to detect and correct errors in page data 14-page data 20. The RAID verification data RP3 is generated by performing RAID verification data encoding on page data 21-page data 27, and can be utilized to detect and correct errors in page data 21-page data 27. The RAID verification data RP4 is generated by performing RAID verification data encoding on page data 28-page data 34, and can be utilized to detect and correct errors in page data 28-page data 34.

Please note that although the term "RAID" may imply that RAID verification data is stored on a redundant flash memory chip or die, this is not required. In some cases, redundant planes, redundant blocks, and redundant pages may be utilized to store RAID verification data (e.g., RAID parity data).

Figure 3:
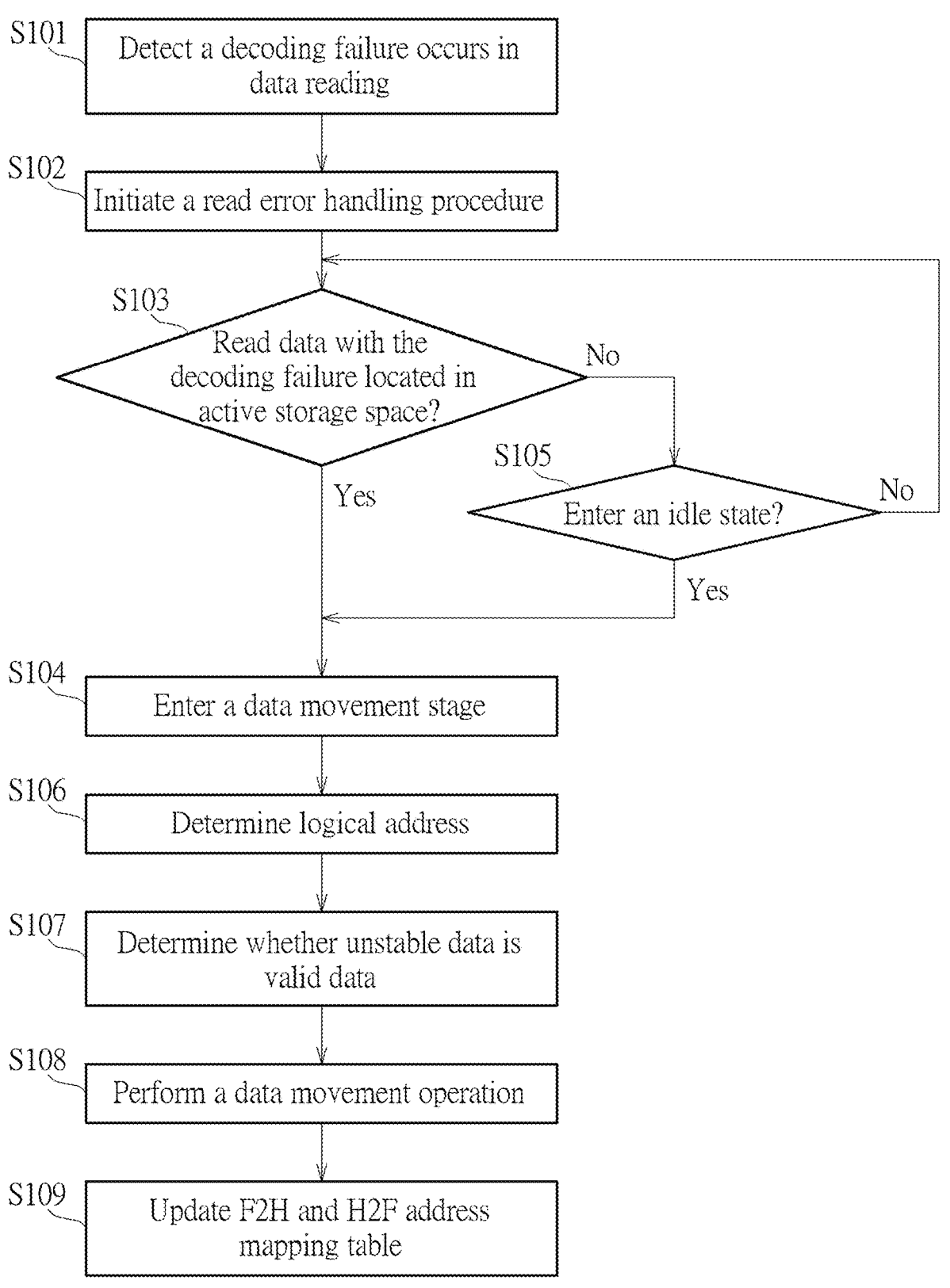
FIG. 3 is a flow chart illustrating an error handling procedure for a read operation according to one embodiment of the present invention.

In the embodiments of the present invention, when the memory controller 110 performs a read operation based on a host command sent by the host device 50, data will be read from the NV memory 120. At this time, the memory controller 110 would perform error detection on the read data. When an error is detected, the memory controller 110 would initiate an error handling procedure of the present invention for data protection. Please refer to FIG. 3, which illustrates an error handling procedure for a read operation according to an embodiment of the present invention. First, at step S101, the memory controller 110 detects that a decoding failure occurs in data reading. In one embodiment, the decoding failure may be a hard decoding failure or a soft decoding failure that occurs when the ECC processing circuit 130 performs an ECC verification operation on read data. Alternatively, the decoding failure may be a RAID decoding failure occurs when the RAID processing circuit 140 performs a RAID verification operation on read data. In one embodiment, when the memory controller 110 reads data from the NV memory 120, the ECC processing circuit 130 performs the ECC verification operation on read data. If the hard decoding of the ECC verification operation cannot correct the error, the soft decoding will be performed. If the soft decoding of the ECC verification operation still cannot correct the error, the RAID processing circuit 140 will perform the RAID verification operation to correct the error. According to various embodiments the present invention, hard decoding failure or soft decoding failure in the ECC verification operation, or RAID decoding failure in the RAID verification operation could trigger the error handling procedure of the present invention (regardless of whether the erroneous data is successfully corrected or not).

Figure 4:
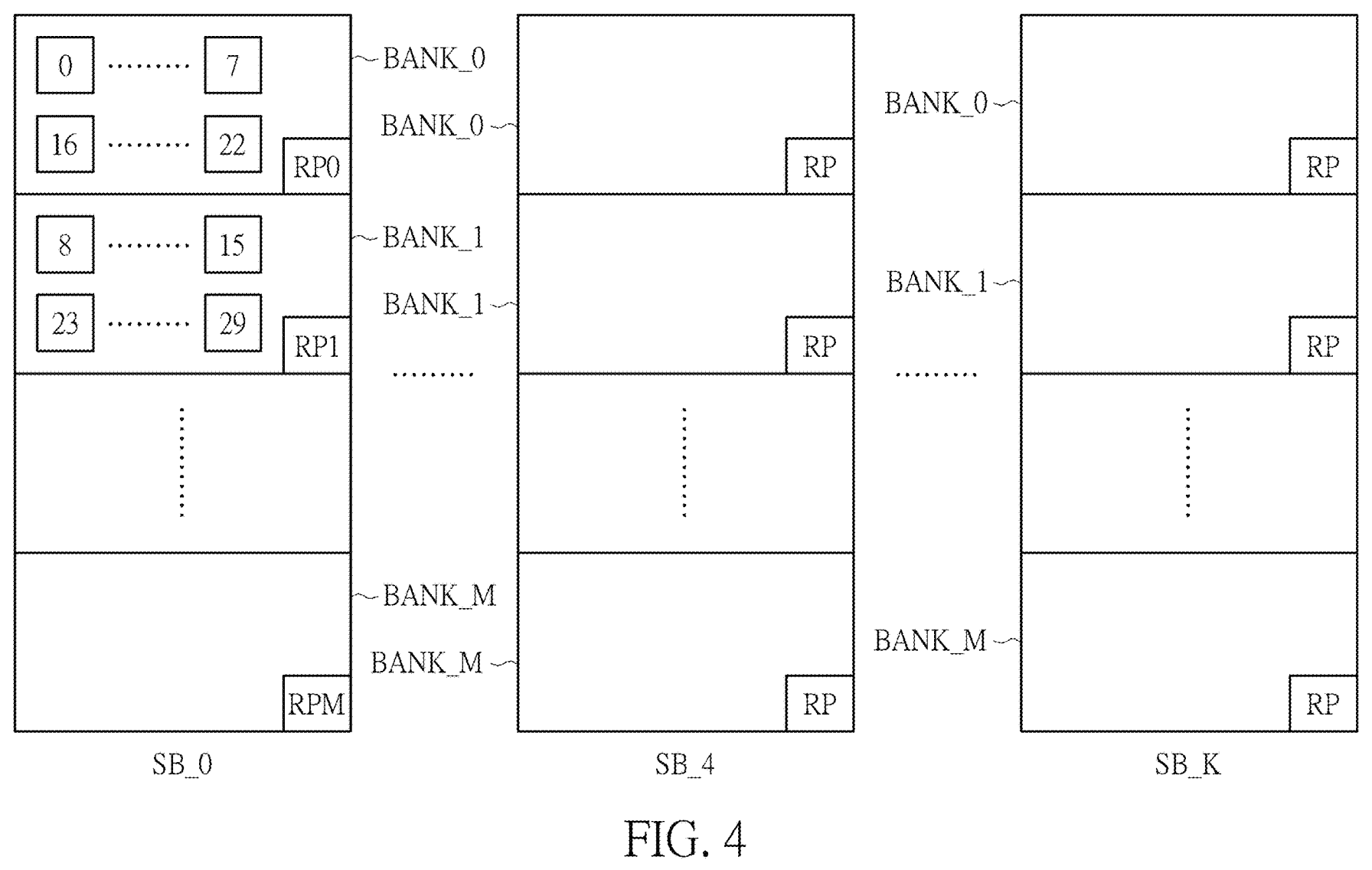

When one of the above decoding failures is detected, the flow proceeds to step S102 to initiate a read error handling procedure, which will be performed while the memory processing 110 is processing host commands of the host device 50 (i.e., the read error handling process runs in the background). Then, the flow proceeds to step S103 to determine whether read data on which the decoding failure occurs (i.e., the read data with the decoding failure) is located in (i.e., read from) an active (i.e., in-use) storage space. In one embodiment, the active storage space may be an active bank of a super block (i.e., the space in the NV memory 120 that is currently used for storing data). Please further refer to FIG. 4, which illustrates an in-block programming strategy according to one embodiment of the present invention. As shown in FIG. 4, each one of super blocks SB_0-SB_K is divided into multiple banks BANK_0-BANK_M. When performing a data writing operation, the memory controller 110 would open a super block (such as the super block SB_0) from the super blocks SB_0-SB_K, and start storing data from the bank BANK_0 of the super block SB_0. If the bank BANK_0 is full, the bank BANK_0 will be closed. Accordingly, the memory controller 110 would write data into the next bank BANK_1, and so on. When the bank BANK_M of the super block SB_0 is full, the super block SB_0 will be closed, and the memory controller 110 will open a new (blank) super block for storing data. During such process, the bank currently being utilized to storing data is called the active bank. Furthermore, in one embodiment, the space of a bank is configured for storing a RAID verification data and all data protected by the RAID verification data. For example, the bank BANK_0 of the super block SB_0 can be configured to store the RAID verification data RP0 and the page data 0-7 and the page data 16-22 protected by the RAID verification data RP0 as shown in FIG. 2A. The bank BANK_1 of the super block SB_0 can be configured to store the RAID verification data RP1 and the page data 8-15 and the page data 23-29 protected by the RAID verification data RP1, and so on.

At step S103, the memory controller 110 would determine whether the read data with the decoding failure is located in (i.e., read from) an active storage space (determined based on a physical address of the read with the decoding failure) where the active storage space may be an active bank. When the read data with the decoding failure is not located in the active bank, the flow proceeds to step S104 to enter a data movement stage. If not, the flow enters step S105. At step S105, the memory controller 110 would determine whether to enter an idle state. For example, when there is no pending host read or write command, the memory controller 110 may enter the idle state. If it is determined that the memory controller 110 is about to enter the idle state, the memory controller 110 would write dummy data into a remaining available space of the active storage space (e.g., the active bank) even if the read data with the decoding failure is still located in the active storage space (e.g., the active bank), such that the active storage space will be filled with data and closed, and step S104 is accordingly entered. On the other hand, if it is determined that the memory controller 110 is not about to/does not enter the idle state, the flow returns to step S103 and continues to determine whether the read data with the decoding failure is still located in the active storage space.

At step S104, the data movement stage begins, in which the memory controller 110 determines unstable data with a risk of corruption (i.e., stored data associated with the same RAID verification data as the read data with the decoding failure). Specifically, a protection capability provided by a RAID verification data is limited. When a decoding failure occurs in stored data that a specific RAID verification data protects, this means that when errors occur again in other stored data protected by the specific RAID verification data, the specific RAID verification data may not be able to correct the errors. Taking the RAID-type verification mechanism shown in FIG. 2A as an example, when a decoding failure occurs on page data 3, the memory controller 110 will deems that the page data 0-7 and the page data 16-22 protected by the RAID verification data RP0 has the risk and may be not error-correctable. That is, the page data 0-7 and the page data 16-22 are deemed as unstable data. Therefore, at step S104, the memory controller 110 determines the stored data associated with same RAID verification data as unstable based on the physical address of the read data with the decoding failure. At step S106, the memory controller 110 determines a logical address (e.g., logical block address, LBA) corresponding to each unstable data (e.g., the page data 0-7 and the page data 16-22). In one embodiment, the memory controller 110 could calculate a host block number (HBlock No.) and a host page number (HPage No.) corresponding to each unstable data at step S106 to facilitate checking an address mapping table in the following process. For example, logical block address 0 may correspond to host block number 0 (HBlock 0) and host page number 0 (HPage 0), and logical block address 1 may correspond to host block number 0 (HBlock 0) and host page number 1 (HPage 1).

Figure 5:
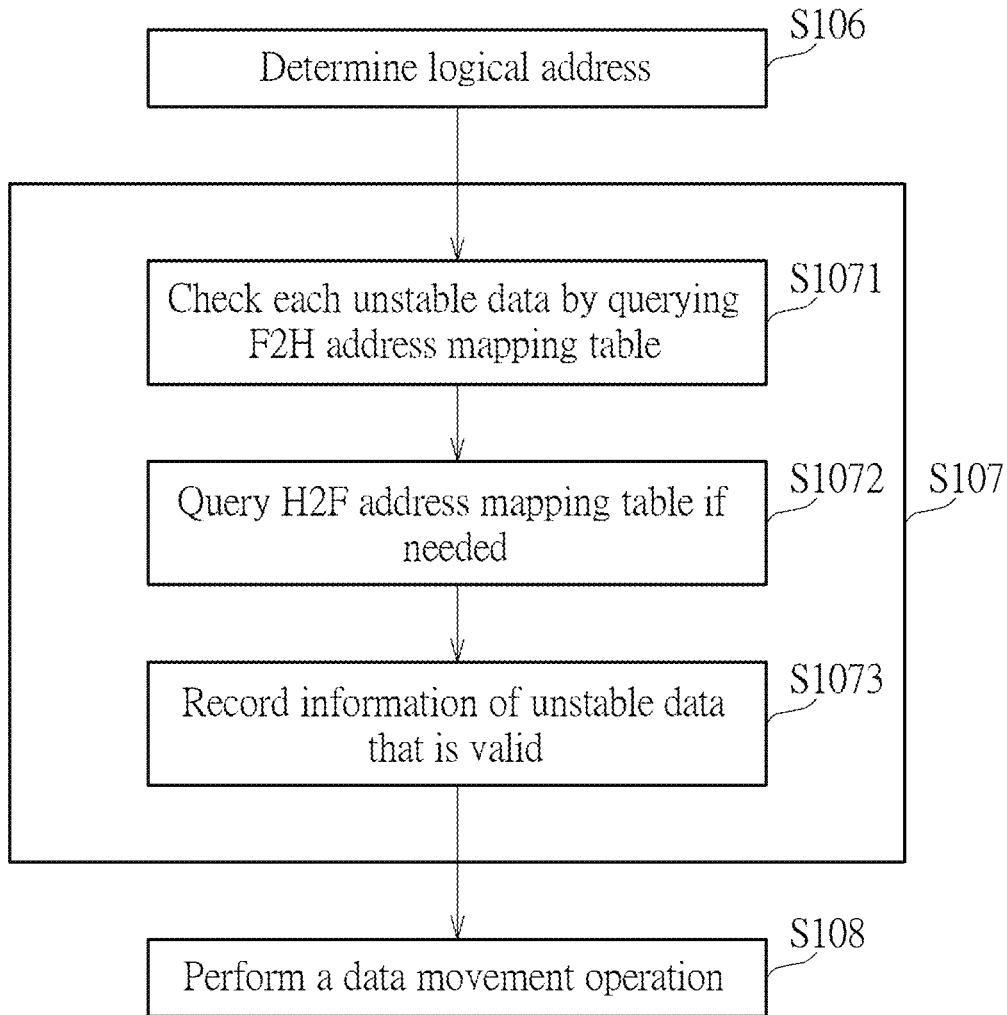
FIG. 5 is a flow chart illustrating a valid data determination process according to one embodiment of the present invention.

At step S107, the memory controller 110 would determine whether each unstable data is valid data. For example, it is confirmed whether there is data at other addresses corresponding to a same logical address of the unstable data. If the unstable data is not valid, it will be excluded in a subsequent data movement operation. If the unstable data is valid, it will be moved to a target storage space of the NV memory 120 in the subsequent data movement operation. In one embodiment, step S107 further includes sub-steps as shown in FIG. 5, in order to check whether each unstable data is valid data. First, at step S1071, the memory controller 110 queries a flash-to-host (F2H) address mapping table cached in the internal memory 113 to confirm whether there is an entry corresponding to an unstable data in the F2H address mapping table. Specifically, the F2H address mapping table is dynamically maintained, and each of the entries therein is indexed by a physical address and records a corresponding logical address. If the F2H address mapping table loaded in the internal memory 113 has an entry corresponding to the unstable data, and the entry points to the unstable data, it means that the unstable data is the latest data and therefore regarded as valid. At this time, step S1073 will be entered. If the F2H address mapping table cached in the internal memory 113 has an entry corresponding to the unstable data, but the entry does not point to the unstable data (; for example, there are multiple entries pointing to a same logical address, and the entry is not the latest entry), it means that the unstable data is old data and therefore regarded as invalid data. If the F2H address mapping table cached in the internal memory 113 does not have an entry corresponding to the unstable data, then step S1072 is entered. At step S1072, the memory controller 110 queries a host-to-flash (H2F) address mapping table stored in the NV memory 120 to confirm whether the unstable data is valid data or not. Specifically, the H2F address mapping table provides a global mapping information query mechanism using logical addresses as indexes. The memory controller 110 can query the H2F address mapping table to confirm whether the logical address of the unstable data points to the physical address of unstable data. If yes, it means that the unstable data is the latest data and therefore regarded as valid data. Accordingly, the flow proceeds to step S1073. If not, the unstable data is old data and therefore regarded as invalid data. At step S1073, information regarding the unstable data (only when the unstable data is valid data) is recorded.

Please refer to FIG. 3 again. Through step S107, the memory controller 110 excludes invalid data from all unstable data and regards valid unstable data as data to be moved. Accordingly, at step S108, a data movement operation will be performed based on the physical address of the data to be moved that are recorded at step S107. This includes: reading the data to be moved according to the recorded physical addresses thereof, and writing the read data to be moved to a target storage space in the NV memory 120. In one embodiment, the target storage space may be a bank of a super block. For example, if the data to be moved is located in the bank BANK_2 of the super block SB_4, the target storage space may be the banks BANK_3, BANK_4 . . . and so on. However, in other embodiments, the target storage space may be in other blocks or other super blocks in the NV memory 120. Furthermore, when the read data with decoding failure (if the read data is valid data) is moved, it will also be corrected through the ECC processing circuit 130 or the RAID processing circuit 140, such that corrected read data will be moved. In one embodiment, if the ECC processing circuit 130 or the RAID processing circuit 140 cannot correct the read data with the decoding failure, the memory controller 110 may choose whether to move the read data or not. At step S109, the cached F2H address mapping table in the internal memory 113 is updated based on (target) physical addresses and corresponding (target) logical addresses which the data to be moved are programmed to at step S108. That is, the block number (HBlock) and the page number (HPage) which the data are programmed to are updated to the F2H address mapping table. Accordingly, at a specific timing, the H2F address mapping table in the NV memory 120 will be updated according to the F2H address mapping table cached in the internal memory 113.

Figure 6:
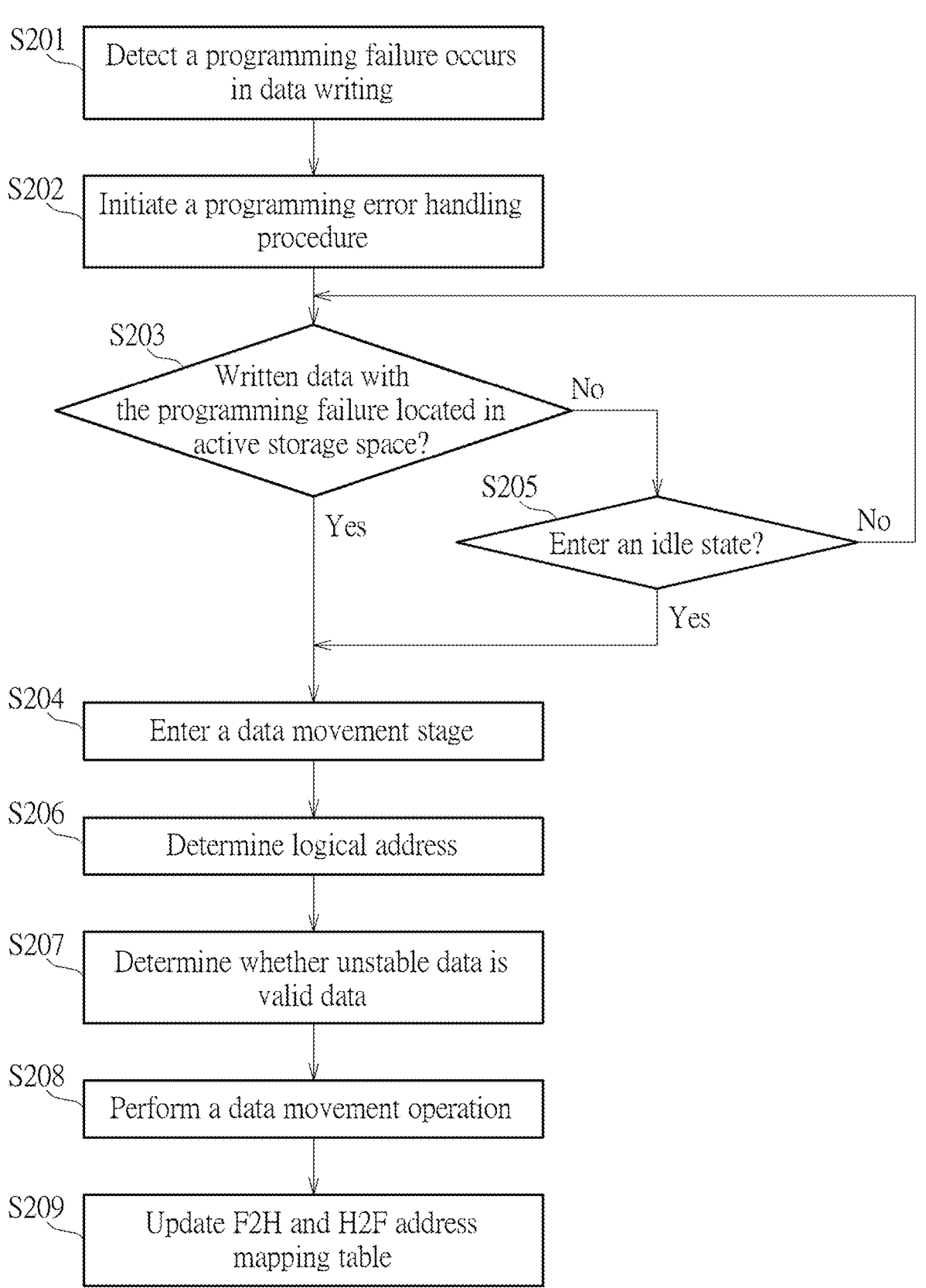
FIG. 6 is a flow chart illustrating an error handling procedure for a programming operation according to one embodiment of the present invention.

In one embodiment, when the memory controller 110 performs a write operation based on a host command sent by the host device 50, data will be programmed into the NV memory 120. At this time, the memory controller 110 will determine whether a programming failure (e.g., program fail) occurs according to a message returned by the NV memory 120. When the programming failure is detected, the memory controller 110 would initiate an error handling procedure of the present invention for data protection. Please refer to FIG. 6, which illustrates an error handling procedure for a programming operation according to one embodiment of the present invention. First, at step S201, the memory controller 110 detects that a programming failure occurs in data writing. Then, the flow proceeds to step S202 to initiate a programming error handling procedure, which will be performed while the memory processing 110 is processing host commands of the host device 50 (i.e., the programming failure handling procedure runs in the background). Then, the flow proceeds to step S203 to determine whether written data on which the programming failure occurs (i.e., the written data with the programming failure) is located in (i.e., programmed to) an active storage space. In one embodiment, the active storage space may be an active bank of a super block (please refer to the in-block programming strategy shown in FIG. 4).

At step S203, the memory controller 110 would determine whether the written data with the programming failure is located in (i.e., programmed to) an active storage space (determined based on a physical address of the written data with the programming failure). When the written data with the programming failure is not located in the active bank, step S204 will be entered to start a data movement stage. If not, step S205 will be entered. At step S205, the memory controller 110 determines whether to enter an idle state. If it is determined that the idle state is about to enter, the memory controller 110 would write dummy data into the remaining available space of the active storage space (e.g., the active bank) even if the written data with the programming failure is still located in the active storage space (e.g., the active bank), such that the active storage space will be filled with data and closed, and step S204 is entered. On the other hand, if it is determined that the memory controller 110 is not about to/does not enter the idle state, the flow returns to step S203 and continues to determine whether the written data with the programming failure is still located in the active storage space.

At step S204, the memory controller 110 would determine unstable data with a risk of corruption (i.e., stored data associated with same RAID verification data as the written data with the programming failure). Therefore, at step S204, the memory controller 110 would determine the stored data associated with same RAID verification data as unstable based on a physical address of the written data with the programming failure. At step S206, the memory controller 110 determines a logical address (e.g., a logical block address, LBA) corresponding to each unstable data. In one embodiment, the memory controller 110 could calculate a host block number (HBlock No.) and a host page number (HPage No.) corresponding to each unstable data at step S206 to facilitate checking an address mapping table in the following process.

At step S207, the memory controller 110 would determine whether each unstable data is valid data. For example, it is confirmed whether there is data at other addresses corresponding to a same logical address of the unstable data. If the unstable data is not valid, it will be excluded in a subsequent data movement operation. If it is valid data, it will be moved to a target storage space in the NV memory 120 in the subsequent data movement operation. In one embodiment, step S207 further includes sub-steps similar to those shown in FIG. 5 to check whether each unstable data is valid data (explanation and description is not repeated here). Through the above-mentioned step S207, the memory controller 110 excludes invalid data from all unstable data, and regards valid unstable data as data to be moved. Accordingly, at step S208, a data movement operation will be performed based on the physical address of the data to be moved that are recorded at step S207. This includes: reading the data to be moved according to the recorded physical address of the data to be moved, and writing the read data to be moved to a target storage space in the NV memory 120. In one embodiment, the target storage space may be a bank of a same super block that the written data is located. In other embodiments, the target storage space may be other blocks or other super blocks in the NV memory 120. When the written data with the programming failure (if the written data is valid data) is moved, it will also be corrected as correct data through the ECC processing circuit 130 or the RAID processing circuit 140. In one embodiment, if the ECC processing circuit 130 or the RAID processing circuit 140 cannot correct the written data with the programming failure, the memory controller 110 may choose whether to move the written data or not. At step S209, the cached F2H address mapping table in the internal memory 113 is updated based on the (target) physical address and the corresponding (target) logical address which the data to be moved are programmed to at step S208. That is, the block number (HBlock) and the page number (HPage) which the data are programmed to are updated to the F2H address mapping table. Accordingly, at a specific timing, the H2F address mapping table in the NV memory 120 will be updated according to the F2H address mapping table cached in the internal memory 113.

According to the read error handling procedure and the programming failure handling procedure of the aforementioned embodiments, an error handling method of the present invention can be summarized. The method has a simplified handling flow as shown in FIG. 7, including the following steps:

S310: in response to read data on which a decoding failure occurs or written data on which a programming failure occurs, determining verification data corresponding to the read data or the written data;

S320: according to the verification data, selecting data to be moved from a flash memory; and S330: performing a data movement operation to move the data to be moved to a target storage space in the flash memory.

Since principles and specific details of the above steps have been described in detail in previous embodiments, they will not be described again here. It is worth mentioning that the above handling flow can be improved by adding other additional steps or making appropriate modifications and adjustments to improve the efficiency and effectiveness of error handling, thereby further improving data read and write performance, reliability and data integrity of the data storage device.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An error handling method for use in a flash memory, comprising:

performing an error correction code (ECC) verification operation on a page of data read from the flash memory, wherein the page of data corresponds to one or more ECC codewords;

in response to a decoding failure of the ECC verification operation on the page of data occurs or written data on which a programming failure occurs, determining verification data corresponding to the page of data or the written data;

according to the verification data, selecting data to be moved from the flash memory; and performing a data movement operation to move the data to be moved to a target storage space in the flash memory.

2. The error handling method of claim 1, wherein the verification data is redundant array of independent disks (RAID) verification data; and the RAID verification data is generated by performing an exclusive-OR operation on the page of data and one or more stored data in the flash memory, or the RAID verification data is generated by performing an exclusive-OR operation on the written data and one or more stored data in the flash memory.

3. The error handling method of claim 1, wherein the step of selecting the data to be moved comprises:

determining the data to be moved according to one or more stored data in the flash memory that are associated with the verification data.

4. The error handling method of claim 3, wherein the step of selecting the data to be moved comprises:

for each of the one or more stored data associated with the verification data:

determining whether the stored data is valid data based on a logical address of the stored data; and setting the stored data as the data to be moved if the stored data is valid data.

5. The error handling method of claim 4, wherein the step of determining whether the stored data is valid data comprises:

querying a flash-to-host (F2H) address mapping table to determine whether the stored data has a corresponding entry in the F2H address mapping table;

determining whether the stored data is valid data based on the F2H address mapping table if the stored data has a corresponding entry in F2H address mapping table; and determining whether the stored data is valid data based on a host-to-flash (H2F) address mapping table if the stored data does not have a corresponding entry in the flash memory.

6. The error handling method of claim 1, further comprising:

determining whether the page of data with the decoding failure or the written data with the programming failure is read from or programmed to in an active storage space of the flash memory;

not performing the data movement operation if page of data with the decoding failure or the written data with the programming failure is read from or programmed to the active storage space; and performing the data movement operation if page of data with the decoding failure or the written data with the programming failure is not read from or not programmed to the active storage space.

7. The error handling method of claim 6, further comprising:

writing dummy data into a remaining available space of the active storage space if the page of data with the decoding failure or the written data with the programming failure is read from or programmed to the active storage space and the flash memory is about to enter an idle state; and performing the data movement operation after writing the dummy data.

8. The error handling method of claim 6, wherein the active storage space is an active bank of multiple banks of a super block of the flash memory and the target storage space is a different one of the multiple banks of the super block than the active bank.

9. The error handling method of claim 8, wherein each of the multiple banks is utilized to store the verification data and one or more stored data associated with and protected by the verification data.

10. The error handling method of claim 1, wherein the decoding failure is one of a hard decoding failure of an error correction code verification operation and a soft decoding failure of an error correction code verification operation and a decoding failure of RAID verification operation.

11. A memory controller for use in a flash memory, comprising:

a storage unit configured to store program code;

a processing unit configured to execute the program code to perform error handling procedure on the flash memory, comprising:

performing an error correction code (ECC) verification operation on a page of data read from the flash memory, wherein the page of data corresponds to one or more ECC codewords;

in response to a decoding failure of the ECC verification operation on the page of data occurs or written data on which a programming failure occurs, determining verification data corresponding to the page of data or the written data;

according to the verification data, selecting data to be moved from the flash memory; and performing a data movement operation to move the data to be moved to a target storage space in the flash memory.

12. The memory controller of claim 11, wherein the verification data is redundant array of independent disks (RAID) verification data; and the RAID verification data is generated by performing an exclusive-OR operation on the page of data and one or more stored data in the flash memory, or the RAID verification data is generated by performing an exclusive-OR operation on the written data and one or more stored data in the flash memory.

13. The memory controller of claim 11, wherein the processing unit is configured to perform operations of:

determining the data to be moved according to one or more stored data in the flash memory that are associated with the verification data.

14. The memory controller of claim 13, wherein the processing unit is configured to perform operations of:

for each of the one or more stored data associated with the verification data:

determining whether the stored data is valid data based on a logical address of the stored data; and setting the stored data as the data to be moved if the stored data is valid data.

15. The memory controller of claim 14, wherein the processing unit is configured to perform operations of:

querying a flash-to-host (F2H) address mapping table to determine whether the stored data has a corresponding entry in the F2H address mapping table;

determining whether the stored data is valid data based on the F2H address mapping table if the stored data has a corresponding entry in F2H address mapping table; and determining whether the stored data is valid data based on a host-to-flash (H2F) address mapping table if the stored data does not have a corresponding entry in the flash memory.

16. The memory controller of claim 11, wherein the processing unit is configured to perform operations of:

determining whether the page of data with the decoding failure or the written data with the programming failure is read from or programmed to in an active storage space of the flash memory;

not performing the data movement operation if the page of data with the decoding failure or the written data with the programming failure is read from or programmed to the active storage space; and performing the data movement operation if the page of data with the decoding failure or the written data with the programming failure is not read from or not programmed to the active storage space.

17. The memory controller of claim 16, further comprising:

writing dummy data into a remaining available space of the active storage space if the page of data with the decoding failure or the written data with the programming failure is read from or programmed to the active storage space and the flash memory is about to enter an idle state; and

performing the data movement operation after writing the dummy data.

18. The memory controller of claim 16, wherein the active storage space is an active bank of multiple banks of a super block of the flash memory and the target storage space is a different one of the multiple banks of the super block than the active bank.

19. The memory controller of claim 18, wherein each of the multiple banks is utilized to store the verification data and one or more stored data associated with and protected by the verification data.

20. The memory controller of claim 11, wherein the decoding failure is one of a hard decoding failure of an error correction code verification operation and a soft decoding failure of an error correction code verification operation and a decoding failure of RAID verification operation.

21. A data storage device comprising a flash memory and a memory controller of claim 11.

* * * * *